May 31, 1938.     G. E. ANDERSEN     2,118,804
INTERNAL COMBUSTION ENGINE
Original Filed Oct. 24, 1932    5 Sheets-Sheet 3

Inventor
Gunnar E. Andersen
by Parker & Carter
Attorneys.

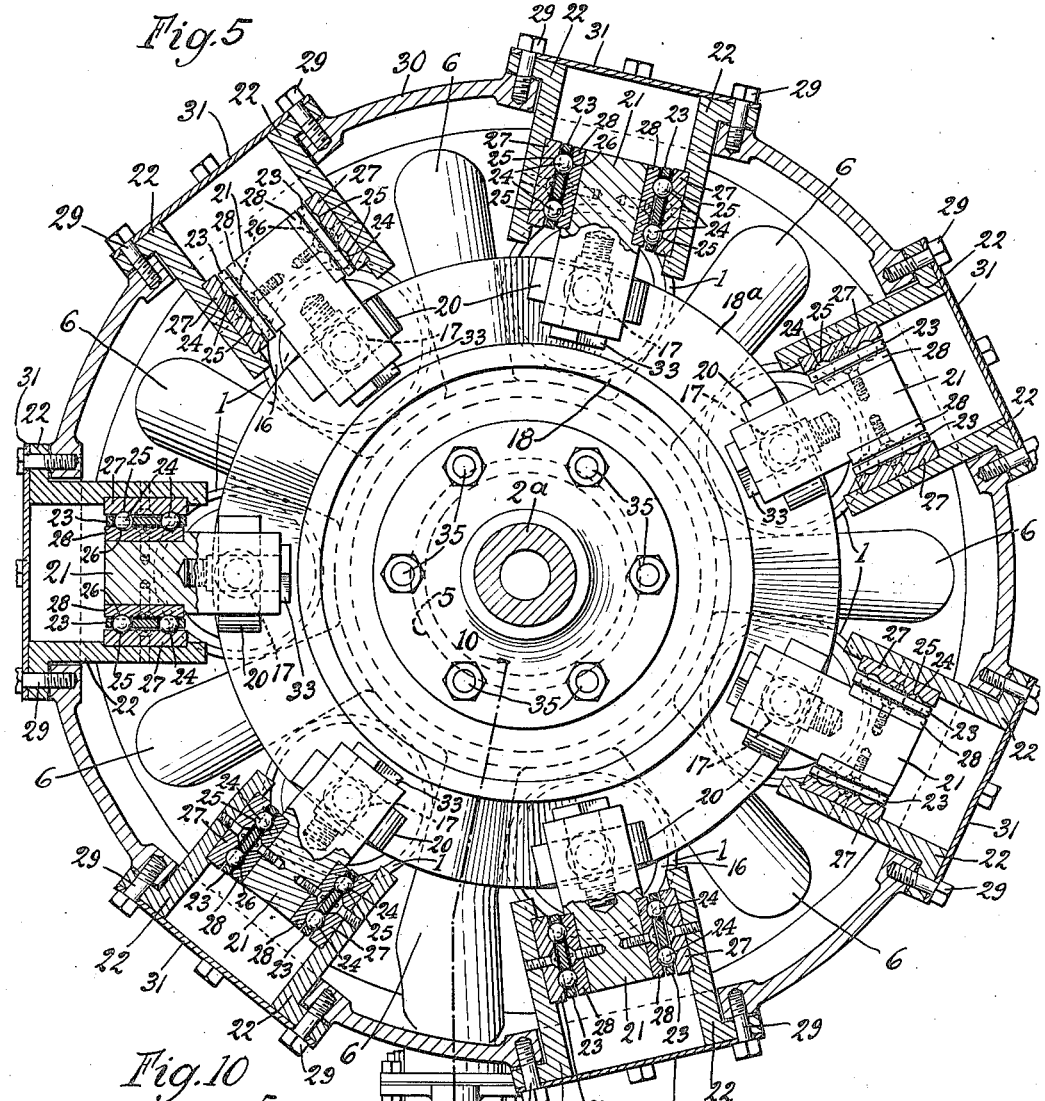
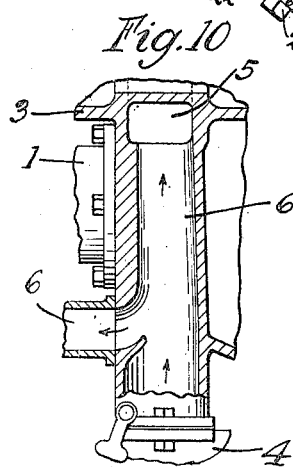

May 31, 1938.　　　G. E. ANDERSEN　　　2,118,804
INTERNAL COMBUSTION ENGINE
Original Filed Oct. 24, 1932　　5 Sheets-Sheet 5
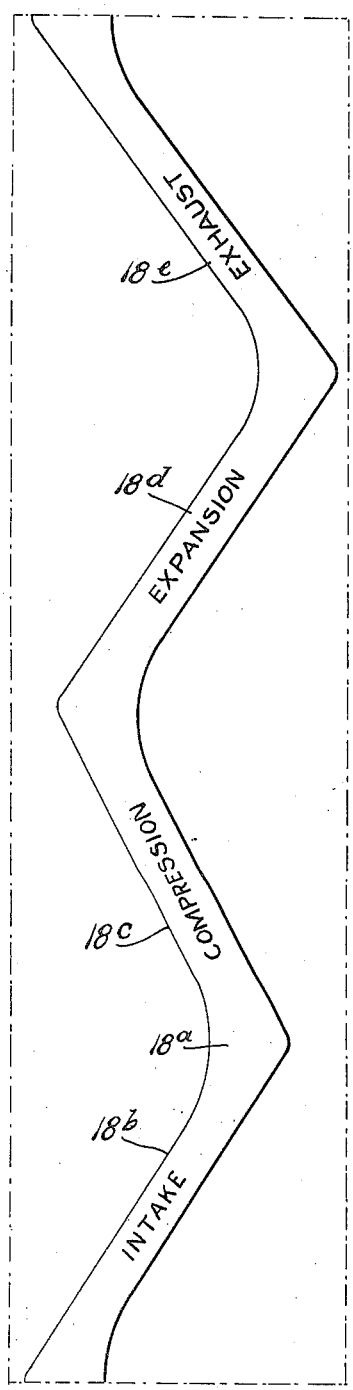
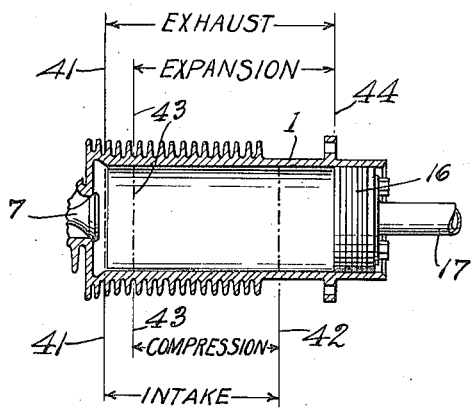
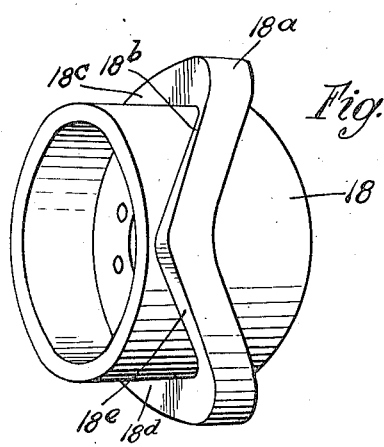
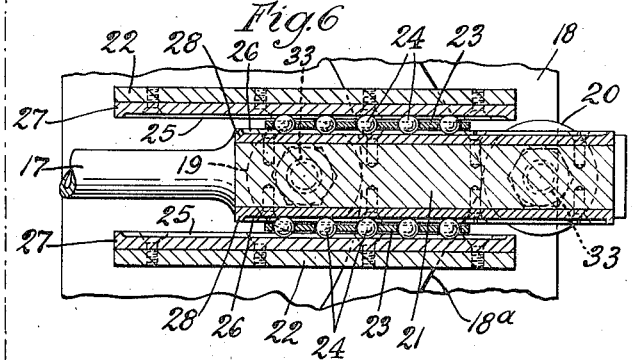
Inventor
Gunnar E. Andersen
by Parker & Carter
Attorneys.

Patented May 31, 1938

2,118,804

UNITED STATES PATENT OFFICE 2,118,804

INTERNAL COMBUSTION ENGINE

Gunnar E. Andersen, Copenhagen, Denmark

Application October 24, 1932, Serial No. 639,177
Renewed August 19, 1937

3 Claims. (Cl. 123—58)

This invention relates to internal combustion engines and has for its object to provide a new and improved engine of this description. The invention has as a further object to provide a four cycle multiple cylinder engine with a different length of stroke for each of the four cycles. The invention has as a further object to provide a barrel type of multiple cylinder engine with the central axis of the cylinders lying in horizontal planes. The invention has as a further object to provide an internal combustion engine wherein the piston rods move substantially parallel with the central axis of the cylinders. The invention has the further object to provide an internal combustion engine which shall have a high efficiency which shall be certain in operation and which shall have a long life.

The invention has other objects which are more particularly pointed out in the accompanying description.

Referring now to the drawings:

Fig. 5 is a sectional view taken on the line 5—5 of Fig. 2;

Fig. 6 is an enlarged sectional view taken on the line 6—6 of Fig. 2;

Fig. 7 is a perspective view of the cam with which the piston rods are connected;

Fig. 8 is a layout of this cam shown in Fig. 7;

Fig. 9 is a sectional view of one of the cylinders showing the different lengths of the strokes for the four cycles;

Fig. 10 is a sectional view taken on the line 10—10 of Fig. 5.

Like numerals refer to like parts throughout the several figures.

Figure 1:
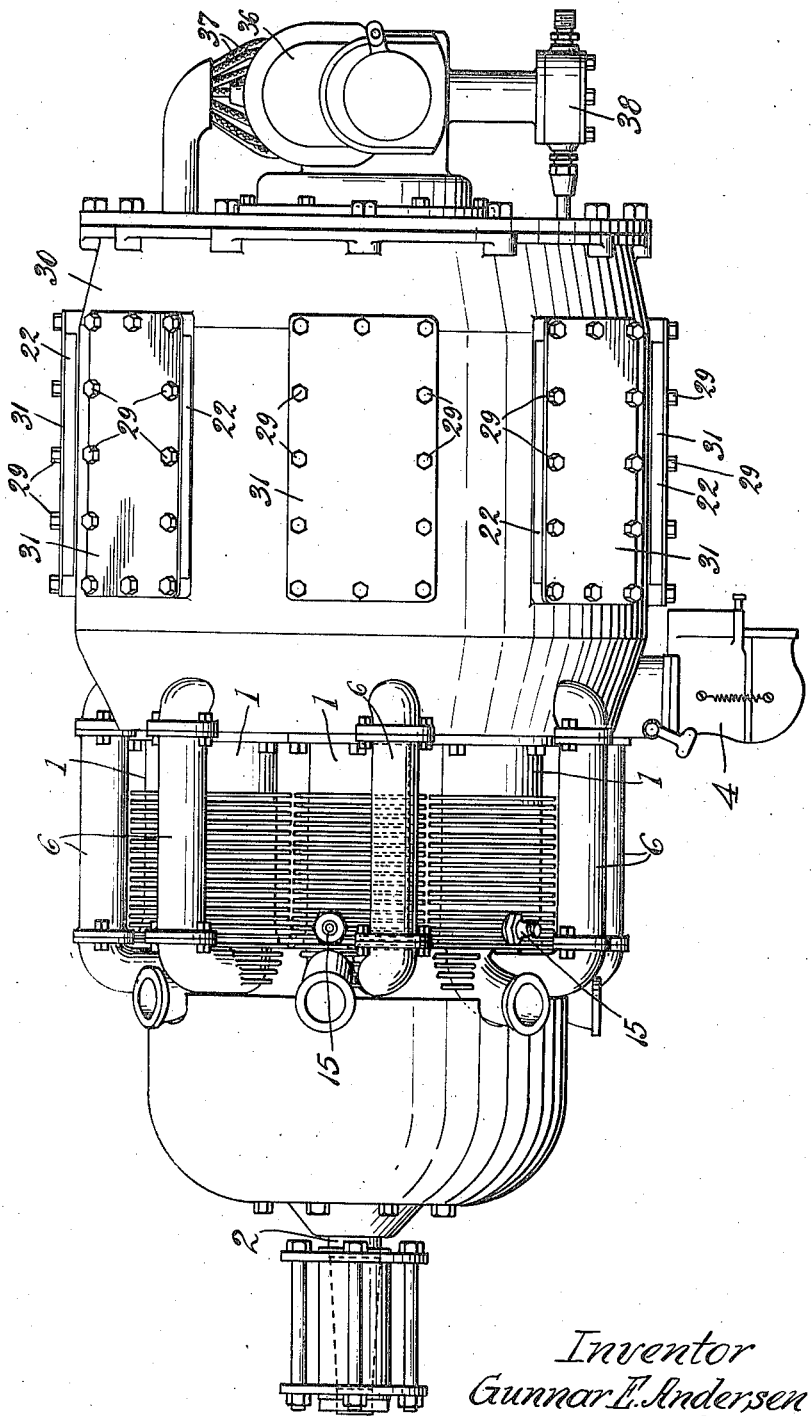
Fig. 1 is a side elevation of one form of engine embodying the invention.

Referring now to the drawings, I have shown one form of engine embodying the invention comprising a plurality of cylinders 1 arranged around the engine shaft 2, the cylinders being substantially parallel to the shaft and extending therealong, the shaft and the axis of the cylinders being in substantially horizontal planes. The cylinders are connected to a central frame 3 in which the engine shaft 2 is mounted. The engine is provided with a suitable carbureter 4, and the explosive material passes into a chamber 5 in the frame 3 and then passes through the admission pipes 6 and is admitted into the cylinders by the valves 7 which are operated by the angle arms 8 which have parts 9 which engage the valve operating cam 10 on the engine shaft. See Fig. 2.

Figure 2:
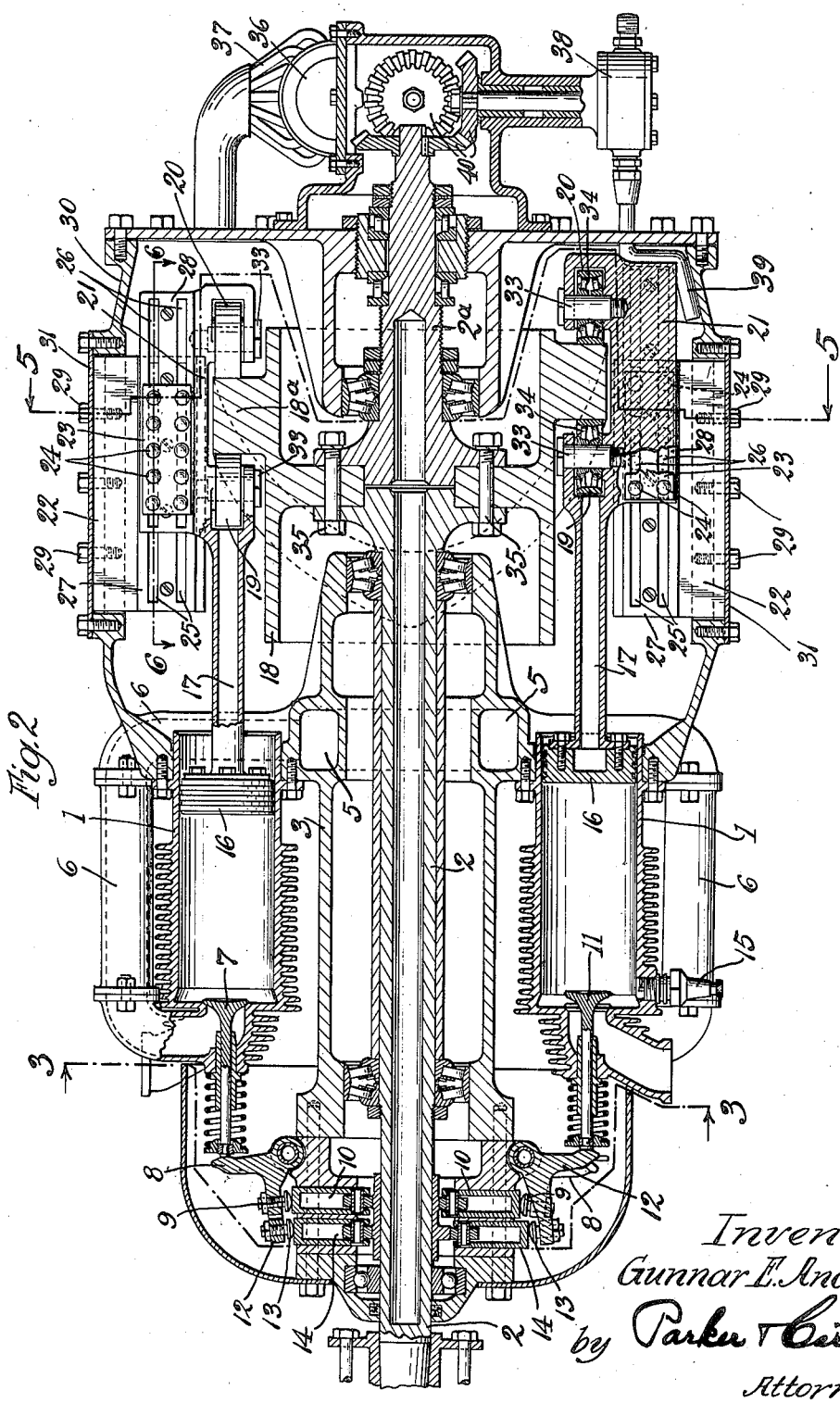
Fig. 2 is a vertical longitudinal sectional view through the engine as illustrated in Fig. 1.
Figure 3:
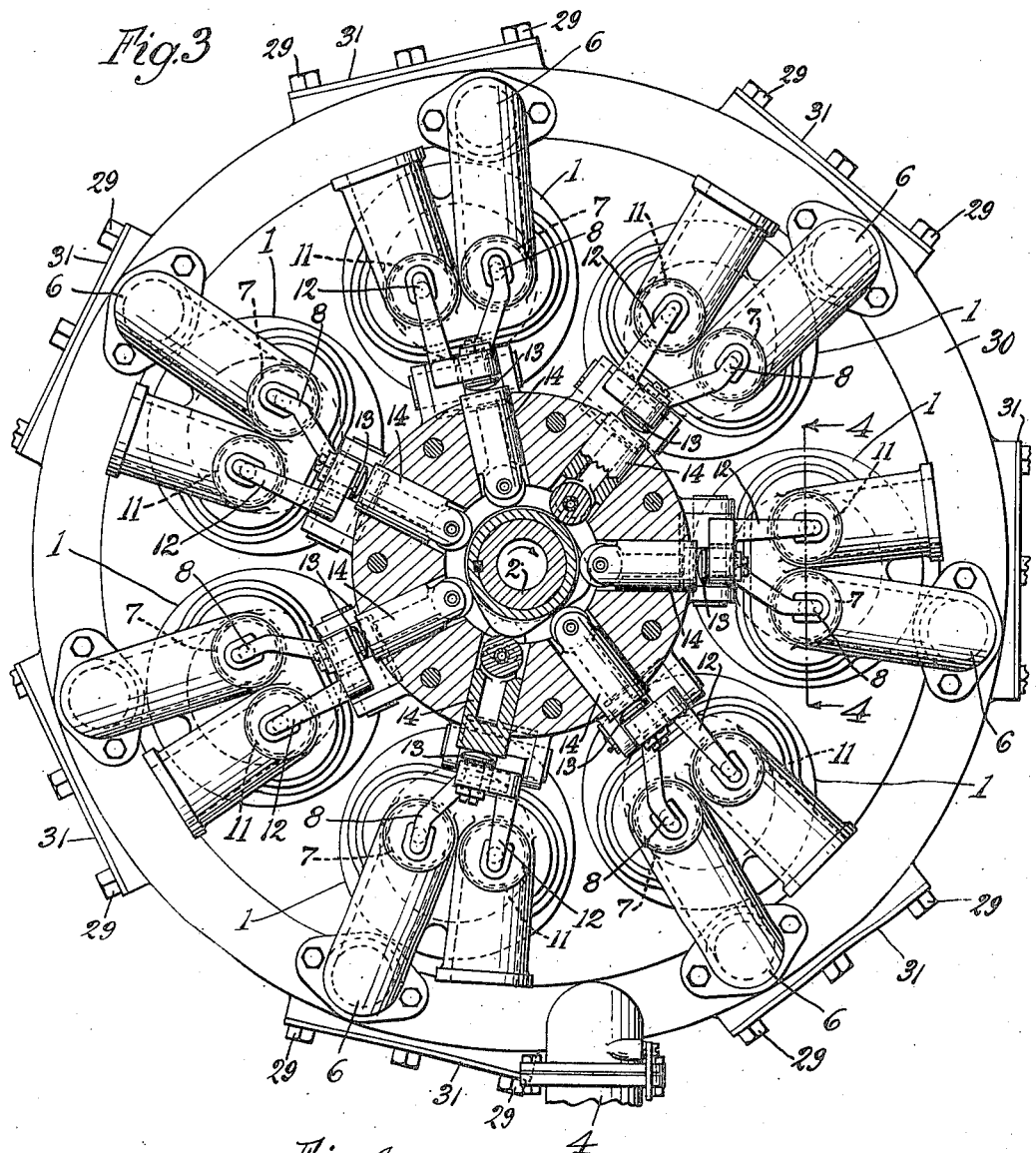
Fig. 3 is a sectional view taken on the line 3—3 of Fig. 2.
Figure 4:
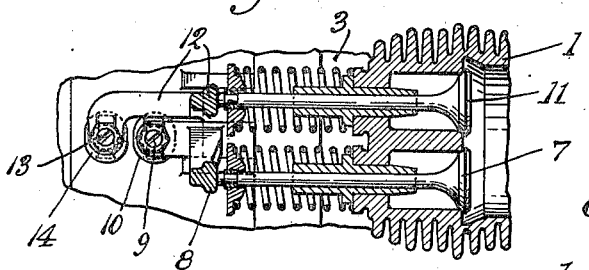
Fig. 4 is an enlarged sectional view taken on the line 4—4 of Fig. 3.

The exhaust from the cylinders is controlled by the exhaust valves 11 which are operated by the angle members 12 which have engaging parts 13 which engage the exhaust valve operating cam 14 on the engine shaft. The engine is provided with the usual spark plugs 15. The pistons 16 of the engine are connected to the piston rods 17. These piston rods engage a cam device 18 connected with the engine shaft and the engine shaft is driven through the piston rods in this cam device. In the particular construction illustrated the piston rods are shown as hollow and are provided with rollers 19, 20 on opposite sides of the cam element 18a. Each piston rod is provided with an offset portion 21 which extends around the cam member 18 and to which the roller 20 is connected as illustrated in Fig. 2.

The piston rods are guided by the guiding members 22 which are attached to the engine frame. Friction reducing devices are arranged for reducing the friction between the piston rods and their guides. As herein shown these friction reducing devices consist of plates 23 having balls 24 therein, the balls projecting on both sides of the plate, the balls running in grooves 25 on the guides and in grooves 26 on the piston rods. I prefer to have the guides provided with removable pieces 27 for the grooves 25 and to have the piston rods provided with removable pieces 28 for the grooves 26 so that the parts can be readily removed and replaced when worn. The piston rod guides 22 are themselves removably connected to the outer engine frame 30 as shown in Fig. 5, said guides being connected with the engine frame by the bolts 29. The plate 31 is connected with these guides as shown. The rollers 19 and 20 on the piston rods are mounted on pins or shafts 33 and are provided with roller bearings 34 to reduce the friction. The cam device 18 is connected with the engine shaft so that the action of the piston rods therein rotate this engine shaft. As herein shown the engine shaft is divided into two sections, 2 and 2a, and the cam device 18 is clamped between the two sections by means of the bolts 35.

The engine is provided with a magneto and timer for the spark plugs which is illustrated at 36, and the conductors 37 therefrom are carried to the spark plugs in the usual manner. An oil pump 38 is provided which has an intake pipe 39 extending into the oil receiving portion of the engine frame or casing. This pump is driven from the engine shaft by means of the gears 40, and the oil is pumped by the pump to the locations where it is to be used.

Figs. 7 and 8 show in detail the cam device for connecting the piston rods with the shaft. The element 18a is provided with four sections 18b, 18c, 18d and 18e. These sections are of different lengths so that the strokes of the cycles will be of different lengths. The length of these strokes is shown in Fig. 9. During the intake of the explosive mixture the rollers 19 and 20 of any given piston rod for any given cylinder are engaging the part of the cam element marked 18b in Fig. 8. The stroke on this intake is shown in Fig. 9 as being between lines 41 and 42, the distance of the stroke being shorter than the length of the cylinder. When the rollers pass to the section 18c of Fig. 8 the piston is moved to compress the charge of the explosive material in the cylinder and is moved from the line 42 to the line 43, the stroke of the piston, therefore, being shorter than its stroke or its intake stroke. The compressed charge is then ignited and the rollers on the piston rod move along section 18d of the cam element. The stroke of the piston in this expansion movement of the exploded charge is greater than the compression movement or the intake movement and extends from line 43 to line 44 of Fig. 9. After the complete expansion movement the rollers on the piston rod engage the section 18e of the cam element, this being the exhaust stroke of the piston, and this exhaust stroke is substantially the complete length of the cylinder, being from the line 44 to the line 41, and is the longest of the four strokes, thereby insuring the entire and complete discharge of the products of combustion due to the explosion of the compressed charge in the cylinder.

I prefer to provide the cylinders of the conventional type with circumferential cooling fins. They are advantageously mounted for efficient cooling, being equally spaced around the forward end of the barrel type crank case and parallel to the propeller shaft.

Fig. 10 is a section through the pipe leading from the carburetor and one of the intake manifolds, as in this construction this pipe from the carburetor is combined with the intake manifold for one of the cylinders.

The use and operation of my invention are as follows:

When the engine is operating, all of the cylinders act alike. In any one cylinder, for example, the piston rod engages the several sections of the cam successively, all of the strokes of the four cycles being accomplished in one revolution of the engine shaft. During the intake movement of the piston the piston rod engages the section 18b of the cam. During the compression stroke the piston rod engages the section 18c of the cam. During the expansion stroke the piston engages the section 18d of the cam, and during the exhaust stroke the piston rod engages the section 18e of the cam. It will thus be seen that in this four cycle engine there is a different length of stroke for each of the four cycles and that the entire four cycles occur during one revolution of the engine shaft, this result being secured by the varied horizontal components produced by the engagement between the engine shaft and the different cam elements, all of which is clearly set out in Figs. 8 and 9.

It will further be noted that the expansion or back stroke is longer than the intake stroke, thus allowing the gases to expand to a larger volume and a lower temperature, and hence the remaining pressure in the cylinder at the end of the expansion stroke is considerably lower than it would be if all of the strokes were of the same length. By letting the pressure drop to, say 10 or 15 pounds above atmospheric pressure or 25 or 30 pounds at the end of the expansion stroke and opening the exhaust valve at the beginning of the exhaust stroke, the exhaust noise will be reduced considerably without the use of a muffling device. Furthermore, the life of the exhaust valve will be greatly lengthened by the drop in pressure and temperature at the time the exhaust valves are opened. The exhaust stroke is the longest of the four and permits better scavenging of the cylinder and higher compression therein.

On the exhaust stroke the piston travels the full length of the cylinder with very little clearance at the end of the stroke, just enough to prevent striking of the parts. The above action cuts down the carbon deposits to a very great extent, such carbon deposits being about ⅓ of the conventional engine of the same size cylinder. The compression stroke is the shortest and the volume of gas drawn in during the intake stroke covers the length of it. The cam device converts the rectilinear motion of the pistons and connecting rods into rotary motion of the driving shaft. This motion results in a super-leverage. The cam can be considered as four inclined planes on a revolving drum secured to the propeller shaft.

The cam has seven followers in the particular engine illustrated, as there are seven cylinders, one for each of the seven cylinders. The followers are the connecting rods connecting the pistons to the cam. The offset portion of the piston rod is fitted with a special ball thrust bearing to carry the side thrust of the cam and centralize the pistons and the cylinders. The thrust consists of four rows of steel balls, two rows on each side of the connecting rod, rolling in parallel grooves or races mounted in proper housings in the crank case. These bearings travel in line with the connecting rod and travel half the distance the rod travels, a feature induced by the roller action of the balls.

It will be noted that the valve action is simplified and very compact in design. It will further be noted that there is one intake and one exhaust cam for opening and closing the fourteen valves, the opening and closing being done through the short right angle rocker arms or angle levers working directly on the valve stem and cam follower or tappet. The one lobe cams are machined on the propeller shaft and are followed by roller tappets. This construction does away with the timing gears and long push rods. The piston and connecting rod connection eliminates the usual piston pin, as well as the piston skirt. This is done by carrying the piston and connecting rod in a ball bearing and cross head outside of the cylinder. The movement of the connecting rod is in straight line instead of rotary motion at the end farthest from the cylinder. This construction increases the life of both cylinder and pistons by eliminating the side thrust on the cylinder walls and pistons. The piston is just a means of support for the piston rings, contact being made by the rings only against the cylinder walls without side thrust at this point, as all the side thrust is taken by the thrust bearing over the cam and connecting rod. The piston is secured to a flange machined on the tubular end of the connecting rod by means of studs and nuts.

The magnetos for the different cylinders are mounted at the end of the rear of the crank case, as shown at 36, and these magnetos are driven by a set of beveled gearing machined with the master gear mounted on the rear end of the extended shaft, as shown in Fig. 2. It will be noted that the propeller shaft is mounted in ball and roller bearings throughout the entire length, and is made in two pieces with the cam bolted between the two flanged ends. The two halves of the shaft are made hollow. The entire engine is lubricated by a spray from a number of jets located at the desired points in the crank case. Any suitable oiling system of course may be used and is no part of the present invention.

This engine has a number of important advantages, among which may be set out—greater fuel conservation of both oil and explosive mixture; a much smaller frontal area; smoother and more efficient operation with freedom from vibration; the engine can be operated over a longer period of time without overhauling; it has increased driving shaft efficiency; is easier to work on and make adjustments when in position; produces less exhaust noise due to the gas expanding more completely in the cylinder before the exhaust valve opens; and has lower weight per H. P. with more H. P. per cubic inch of piston displacement. The engine is particularly adapted to installations in air craft, due to the barrel type designs and the advantageous features hereinbefore mentioned.

I claim:

1. An internal four cycle combustion engine comprising a plurality of cylinders, pistons therein, piston rods connected with said pistons, an engine shaft, a connection between the said piston rods and the engine shaft, and a common means associated with said connection for successively providing a different length stroke of all of the pistons for each of the said cycles.

2. An internal four cycle combustion engine comprising a plurality of cylinders, pistons therein, piston rods connected with said pistons, an engine shaft, a driving connection between the said piston rods and the engine shaft, and a common means associated with said connection for successively providing a different length stroke of all of the pistons for each of the said cycles, said driving connection and means for successively providing a different length stroke for all of said pistons for each of the said cycles, comprising a single cam device on the engine shaft.

3. An internal combustion engine comprising a series of cylinders, pistons in said cylinders, piston rods connected with said pistons, an engine shaft, a cam device on the engine shaft having a plurality of inclined cam sections, each connecting rod having an off-set portion which extends laterally from the connecting rod and around the cam device, the connecting rod engaging the cam device on opposite sides at points in alignment with the connecting rods and applying power to the engine shaft, guides beyond the periphery of said cam device for said connecting rods which confine their movement to a rectilinear movement during the entire stroke of the pistons, said guides comprising plates on opposite sides of the connecting rod, balls in said plates, fixed parts on opposite sides of said connecting rods which are engaged by said balls.

GUNNAR E. ANDERSEN.